United States Patent [19]

Kobus, Jr. et al.

[11] Patent Number: 4,794,520

[45] Date of Patent: Dec. 27, 1988

[54] INTERFACE SYSTEM FOR COMPUTER PORT SHARING OF MULTIPLE DEVICES

[75] Inventors: Paul Kobus, Jr.; George H. Rovin, both of Phoenix, Ariz.

[73] Assignee: C-Guard Laboratories, Inc., Phoenix, Ariz.

[21] Appl. No.: 31,891

[22] Filed: Mar. 30, 1987

[51] Int. Cl.⁴ .................................................. G06F 3/00
[52] U.S. Cl. .................................................... 364/200
[58] Field of Search .............................. 364/200, 900

[56] References Cited

U.S. PATENT DOCUMENTS

| | | | |
|---|---|---|---|
| 3,445,813 | 6/1965 | Price | 340/150 |
| 3,986,169 | 10/1976 | Kobayashi | 340/146.1 |
| 4,048,620 | 9/1977 | Crandall | 340/152 |
| 4,131,881 | 12/1978 | Robinson | 340/167 R |
| 4,381,543 | 4/1983 | Bunten et al. | 364/200 |
| 4,426,697 | 1/1984 | Petersen | 370/85 |
| 4,514,841 | 4/1985 | Sem-Sandberg | 370/55 |
| 4,543,629 | 9/1985 | Carey | 364/200 |
| 4,564,939 | 1/1986 | Hansen | 370/85 |
| 4,613,858 | 9/1986 | Davidson | 340/825.5 |

Primary Examiner—Raulfe B. Zache
Attorney, Agent, or Firm—LaValle D. Ptak

[57] ABSTRACT

Expanded utilization by several different devices from a single output port such as the RS-232 port of a personal computer is effected by connecting the data line of the serial output port in parallel to several different solid state switches each of which is capable of routing the data information to one or the other of two utilization devices. Selection of a particular switch is effected through micro-controllers which are connected to the control line of the serial output port. Unique address messages are supplied to the host computer at a baud rate which is high compared to the normal rate of change of signals on the control lines and these addressing signals are uniquely decoded by the micro-controllers to select a specific micro-controller, then to select a specific output of that micro-controller activating a solid state switch to select the utilization device to communicate with the computer over the data line.

29 Claims, 1 Drawing Sheet

INTERFACE SYSTEM FOR COMPUTER PORT SHARING OF MULTIPLE DEVICES

BACKGROUND

Computer systems, including the increasingly popular personal computers (PC's), frequently employ various types of peripheral equipment such as printers, plotters, machine tools, and the like, for responding to data in the computer to perform various operations in response to programs processed by the computer. To provide a communications link between the computer and these various pieces of peripheral equipment, typically, an output "port" of the computer is connected by means of a cable to the particular utilization device which is to be operated. For example, a serial output port known as the RS-232 port frequently is interconnected by means of a cable to a printer for effecting the transfer of data and control signals from the computer to the printer. Data signals travel over one set of wires in this cable and control signals for controlling the operation for the printer in accordance with the instructions supplied by the computer are supplied over a separate lead or set of wires in the cable. The RS-232 serial output port, and similar output ports (both serial and parallel for various types of computers, are capable of interfacing with only a single serial output device when they are interconnected in this manner.

In an effort to provide a capability of the computer to communicate with different serial output devices, one solution is to simply provide additional dedicated serial output ports. In such a situation, a first output port is connected to a printer, a second output port is connected to a plotter, a third output port is connected to a machine tool, and so forth. This considerably increases costs, however.

Another approach, which presently is available, is the provision of a manual multi-device serial switch block which interfaces between the various different serial devices and a single serial output port of a computer. In such a system, operation of a switch interconnects the serial output port of the computer with a selected one of the utilization devices, each of which are connected by means of a separate cable to the switch block. While this solution to the interface problem is relatively straightforward, it is not particularly "user-friendly", inasmuch as the user must manually determine the correct interconnection between the computer and the desired serial output device each time data is to be passed from the computer to such a device. If the wrong switch is selected or the switch setting is improper, the desired communication does not take place. The user generally is provided with a ready indication of such an error by the computer. The user then must make the proper connection and operate additional keys on the computer to reinitiate the desired communication interface. In addition, if a relatively large number of potential serial output devices are to be controlled by a single output port of a computer, a large number of switches or a relatively complex switch arrangement is required. This further increases the chances for error by the operator in selecting the wrong switch.

In place of employing a manually operated multiple switch to select a desired one of a number of different serial output devices for interconnection with the serial output port of a computer, systems have been developed which connect a computer output data line or bus in common to a number of potential utilization devices and which then employ a separate address bus interconnecting the computer with the different output devices. Unique address signals are sent over the address bus to activate the selected one of the different output devices for receipt of the information on the data bus.

A patent which discloses this type of system is the patent to Price U.S. Pat. No. 3,445,813. The system of Price employs one set of conductors for data, a separate set of connectors for address codes, and a third set of connectors for supplying power from a central computer to a number of different outlying stations. Each of these conductors are bundled together in a cable which is interconnected with all of the different outlying stations. Power is supplied over the power cables to activate at least the address signal decoding portions of the different stations and when an address code uniquely identifying one of those stations is received by such a station, that station is turned on to respond to the information present on the data or information conductors.

Three other patents employing systems which are similar to Price are the patents to Kobayashi U.S. Pat. No. 3,986,169; Crandall U.S. Pat. No. 4,048,620; and Sem-Sandberg U.S. Pat. No. 4,514,841. The systems of all of these patents are similar to one another. None of them is specifically directed to the unique configuration of the output ports of personal computers, such as the RS-232 or 449 ports. In addition, these systems require a relatively large number of connectors for interconnecting the various outlying stations with the central computer.

It is desirable to provide a simple automatically operated system for selecting one of a number of output utilization devices for control and the supplying of data from a single output port of a computer, such as a personal computer (PC).

SUMMARY OF THE INVENTION

Accordingly it is an object of this invention to provide an improved computer interface system.

It is another object of this invention to provide an improved computer interface system for interfacing an output port of a computer with a selected one of several utilization devices.

It is an additional object of this invention to provide an improved multiplex system for connection between the output port of a computer and a plurality of utilization devices for automatically effecting interconnection between the computer and a selected one of the utilization devices in response to addressing signals supplied from the computer.

It is a further object of this invention to provide a multiplexing selection system for interconnecting a selected one of a number of different utilization devices with a single output port of a computer in response to encoded addressing signals superimposed on the control leads of the output port.

In accordance with the preferred embodiment of this invention, a multiple device addressing and routing system for selectively supplying data from a single output port of a computer to one of several utilization devices includes a controller coupled to the control line of the output port. The controller includes circuitry for decoding an address message superimposed on the normal control line signals for providing an output signal to a switch. The switch then routes at least the data signals on the data line of the output port to a selected one of at least two utilization devices as determined by the address message.

DETAILED DESCRIPTION

Figure 1:
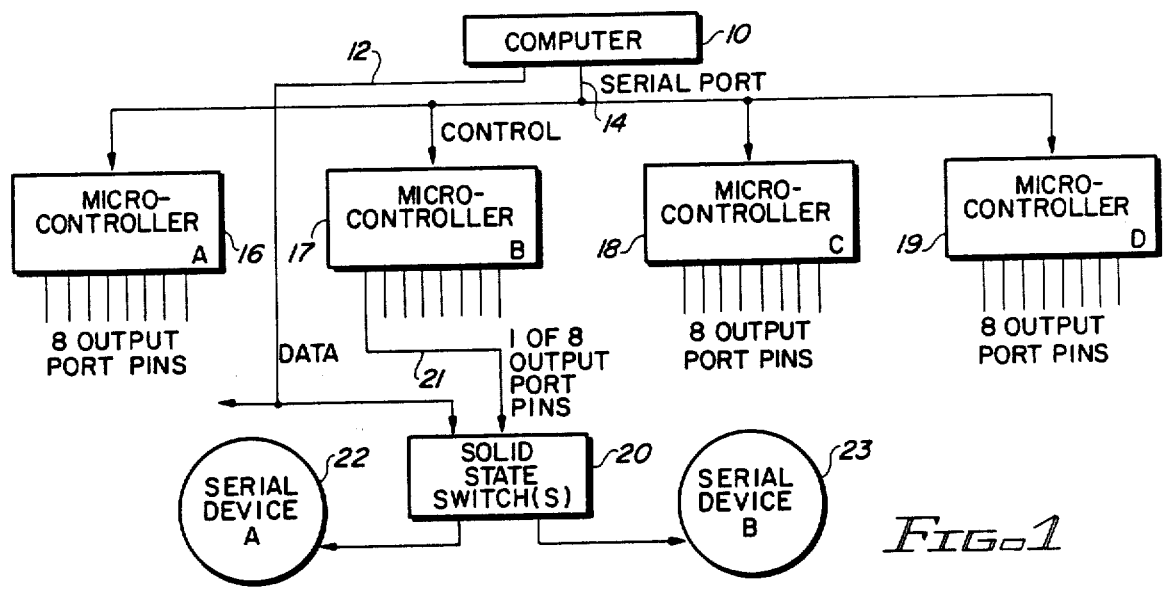
FIG. 1 is a block diagram of a preferred embodiment of the invention.

Reference now should be made to the drawing in which the same reference numbers are used in both figures to designate the same or similar components.

Figure 2:
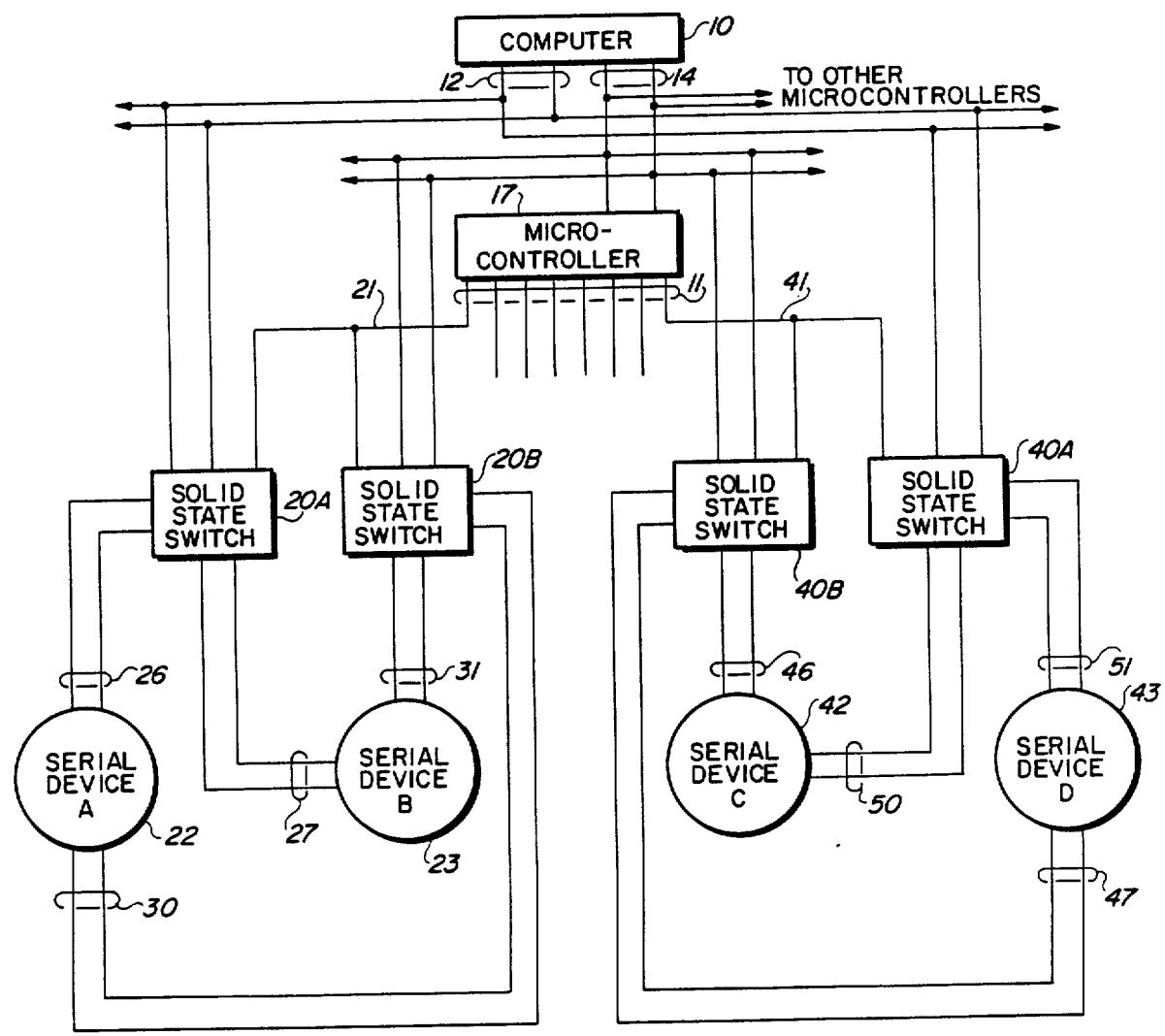
FIG. 2 is a more detailed block diagram of a portion of the embodiment shown in FIG. 1.

As illustrated in both FIGS. 1 and 2, a host computer or a central computer 10 has at least one serial output port which includes a data line (or lines) 12 and a control line (or lines) 14 for effecting the transfer of data from the computer 10 to an interconnected serial output utilization device, such as the devices 22 and 23 shown in FIG. 1.

For purposes of this discussion, a typical output port for a personal computer (PC) 10 is the RS-232 or 449 serial port. The serial output port of the computer which is most frequently used today is the RS-232 interface. This interface has 25 pins, of which most are not used. Of those pins, pin 1 normally is used for a protective ground, affecting shielding by the cabinets; and pin 7 is for a data signal ground. For DCE computer pin 3 is for transmission of serial data bytes from the computer to the external devices; and pin 2 is for the reception of serial data. For DTE computers, the function of pin 2 is for transmission from the computer; and pin 3 is for the receiption of serial data. Pins 2, 3, and 7 are called the signal data lines. A few of the other pins, as needed for different external devices, are used for control lines. For example, pin 8 is used to indicate to the computer that a carrier is present at an associated modem by exhibiting a "high" signal. This signal like others on other control lines changes infrequently (i.e. is semi-static). Usually these signals are either "high" voltages (typically +5 volts) or "low" (typically "ground" voltage).

The RS-232 cable which extends to the connected external device makes the control voltage available to the external device makes the control voltage available to the external device. Typically, only a single utilization device, such as the device 22 of FIG. 1 is interconnected by means of a cable to the RS-232 serial output port of the computer 10 at any given time. If a different device is to be controlled by or is to interface with the computer 10, the first device must be unplugged and a cable for the second device is plugged into the RS-232 port.

Normally the control signals on the control line vary infrequently (they are either "high" for a long period of time or "low" for a long period of time) or vary at a very slow baud rate. On the other hand, the signals on the data line 12 vary at a relatively high baud rate, typically 300 to 9600 baud, depending upon the particular utilization device which is interconnected with the computer 10. The control lines are used to control the turning on and off of the utilization device, and to perform other "control" functions whereas the data line 12 is used to transfer data to the utilization device from the computer 10 and vice- versa.

To permit the simultaneous, permanent interconnection of a number of different utilization devices to a single serial output port with unique selection of one device at a time for communication with the computer 10, the system shown in FIGS. 1 and 2 has been developed. In FIG. 1 the computer 10 is shown having at least one serial port, with a data line 12 and a control line 14 connected to that port. Normally, both the data device for operating that device and communicating with that device in accordance with the data signals appearing on the line 12 and the control signals appearing on the line 14. In the system shown in FIG. 1, however, the serial port lines 12 and 14 are connected in a manner to permit the computer 10 to control any one of sixty-four different serial devices automatically in accordance with signals superimposed upon the normal control signals on the control line 14. These signals may be entered by the keyboard of the computer or provided by software programs run in the computer 10.

As shown in FIG. 1, the host computer 10 has the serial port control line 14 (which may be one or more of its serial port control lines) connected in parallel to an interrupt or control pin of each of four different micro-controllers 16, 17, 18, and 19. These micro-controllers typically are microprocessor based and one which has been found suitable for the application of the system illustrated in FIG. 1 is the Intel 87C51. Each micro-controller 16 through 19 has eight different output port pins, and each of these output port pins is connected to a solid state switch circuit 20 (which may comprise a single switch or a pair of switches).

To avoid unnecessary cluttering of the drawing, only a single, solid state switch 20 is shown in FIG. 1 connected to the left-most output of the micro-controller 17. It should be noted, however, that similar solid state switches also are connected to all of the other seven outputs of the micro-controller 17, as well as to all eight outputs of each of the other micro-controllers 16, 18, and 19. All of the solid state switches, such as the switch 20 shown in FIG. 1, also are connected in parallel to the data line 12 from the serial port; so that the available data on the data line 12 is supplied simultaneously to all thirty-two solid state switches, such as the switch 20. Each solid state switch in turn is operated to supply data appearing on the data line 12 to one or the other of two serial devices such as the serial device 22 and the serial device 23 (devices A and B, respectively) shown in FIG. 1. The operation of the switch 20 (and all of the other switches which have not been shown) is such that the switch 20 may be placed in any one of three states of operation, namely 1) blocking the flow of data through the switch to either of the devices 22 or 23; 2) supplying data to one of the devices, such as the device 22, while blocking the supply of data to the other device, such as the device 23; or 3) supplying data to the other device, such as the device 23, while blocking the supply of data to the first device, such as the device 22.

In the operation of the system of FIG. 1, the data lead 12 functions in its normal manner to supply data from the computer 10 to the selected serial device, such as the device 22 or 23. Control signals are supplied through the selected micro-controller 16 through 19 and then through the selected one of the eight output port pins of the selected controller and through the solid state switch circuit 20 to control the selected serial device in a normal manner by the control signals normally present at a serial output port. In addition to the normal control signals appearing on the control line 14, however, additional control or addressing signals are superimposed on the relatively slowly varying normal control signals provided on the control leads 14.

The normal control signals which currently are employed on the control leads of the serial port of the computer 10 continue to be used. These signals are not changed. Such control signals vary infrequently during the operation of the system and generally may be considered at a semi-static level of activity. The control signals remain in one or the other of two different states for prolonged periods of time during the operation of the computer 10 and primarily are used to turn on or activate a selected serial device at infrequent intervals for communication to and from the computer 10.

Addressing and selection signals are superimposed through the computer 10 (as mentioned previously either by keyboard entries or as built into the software being operated by the computer) to cause a toggle signal to be superimposed on the normal control signals on the control line 14. This toggle signal is at a baud rate which is significantly higher than the semi-static rate of change of control signals normally appearing on the lead, 14 so that it has no affect on the normal control signals which are sensed by relatively slow acting response circuits in the various serial devices such as the devices 22 and 23. This additional toggle signal used for providing the appropriate selection and control addresses through the microcontrollers 16 through 19 to select one of the possible sixty-four serial devices, occurs in five distinct phases:

1. Power-up
2. Micro-controller addressing (base address)
3. Output port pin addressing (intermediate address)
4. Output port pin state (detailed address)
5. Power-down Since it is not desirable to consume anything more than a minimum of power by the micro-controllers 16 through 19 when they are not in use, Phase 1 is used to activate the selected one of the micro-controllers 16 through 19 to be switched from its low power state to a high power state by a unique number of binary encoded high baud rate toggles superimposed on the control line 14 and recognized by the stored program in each of the micro-controllers 16 through 19. This shifts the selected micro-controller only to a relatively high power state, which contrasts with the low power or standby state of the non-selected micro-controllers.

After the selected micro-controller 16 through 19 is placed in it higher power state, Phase 2 of the encoded signal is transmitted by the computer if more than one controller 16 through 19 are used. If only a single controller is connected to the serial output port, this portion of the address is not necessary. If more than one controller is used (as is illustrated in FIG. 1) the next portion of the address toggle signal is a unique number to identify the address of the single micro-controller which is to be selected. This number, by way of example may be a series or toggle (on/off switching) or a binary representation of the number "5" for selecting micro-controller 16; "6" for selecting micro-controller 17; "7" for selecting micro-controller 18; and "8" for selecting the micro-controller 19. All four of the micro-controllers 16 through 19 are placed in their higher power state for responding to address signals appearing on the control line 14 and they are programmed to recognize an address unique to each controller. When the address for the particular controller, such as the controller 17, is received and recognized, only that controller (and none of the others) responds to or acts upon the third phase of the toggling sequence. At this time, the unselected micro-controllers, such as 16, 18, and 19, are returned to the low power state to minimize power consumption by the system.

During the third phase, the third portion of the address signal generated by the computer 10 identifies the particular output port of the selected micro-controller (in this example controller 17) which is connected to the serial device with which the data communications line 12 is to be connected. Since there are eight pins, the encoded signal may be an appropriate combination of a multi-bit binary signal or a unique number of toggles which uniquely identifies the one of the eight pins connected to the solid state switch 20 used to ultimately control the selection of the desired serial device. As illustrated in FIG. 1, assume that this third portion of the address signal, as decoded by the micro-controller 17, selects the left-most one of the eight output port pins to supply control signals to the solid state switch 20 and to enable passage of data signals on the data line 12 to and from the switch 20.

The fourth phase of the address signal is to select the particular one of the two possible outputs from the solid state switch which is connected to the desired serial device 22 or 23, which is to communicate with the computer 10. This again may be a binary encoded signal or a fixed number of toggles to switch the solid state switch 20 from its normal "off" state of operation to the desired state of operation, either left or right (as viewed in FIG. 1), as determined by the nature of the fourth phase of the address code.

When the system has completed decoding the signals through the first four phases of the address, communications between the computer and the selected serial device (22 or 23) may be effected in the normal manner. Control signals on the lead 14 are passed through to the selected serial device; and the data signals appearing on the data line 12 communicate between the computer and the selected serial device. Only one serial device, such as the device 22, out of all of the possible sixty-four serial devices which may be utilized in the example of FIG. 1 is enabled to communicate with the computer 10 during this time interval. At any given time, the addressing signal selects only one serial device through the process mentioned above. There may be some applications which could arise in which communications simultaneously with more than one serial device may be desired. If so, the system may be encoded to permit this to take place through a single selected micro-controller such as the micro-controller 17. This, however, does not appear to be a likely event.

It should be noted that the foregoing system permits selection of any one of the eight output port pins of any one of the controllers 16 through 19. Then, in turn, the system permits selection of one or the other of each of the two serial devices; which are connected through the solid state switches (such as 20) to each of these output port pins. Once the system has been interconnected as illustrated in FIG. 1, no changing of cables between the serial port of the computer 10 and different serial devices is necessary to effect the necessary communications. Everything can be effected automatically, as described above.

After completion of the desired communications between the computer 10 and the selected serial device, such as the device 22 or 23, Phase 5 is reached by the computer 10. The computer software determines that the serial port no longer is required and this is evidenced by the final or fifth phase unique toggling sequence generated by the computer software as it is superimposed at a "high" baud rate on the control line 14. Receipt of this signal by the previously activated micro-controller (the micro-controller 17 in the present example) causes that micro-controller to be returned to the low power state, along with the other micro-controllers 16, 18, and 19 which were returned to this state at the end of Phase 2 addressing.

The system operation is not dependent upon any particular type of encoding for the address toggle signals. The baud rate of the toggle signals, whichever mode of encoding is used, typically is at a standard communications baud rate such as 300 baud, 1200 baud, 9600 baud (or higher). This is significantly higher than the semi-static control signals over which these address signals are superimposed on the control line 14.

Reference now should be made to FIG. 2, which illustrates in greater detail the interconnections between the micro-controller 17 and the solid state switch circuits. Once again, to avoid unnecessary cluttering of the drawing, portions of the circuit which are duplicated by means of the various parallel connections have been eliminated. Consequently, only the single micro-controllers 17 has been illustrated in FIG. 2. It should be understood, however, that additional micro-controllers, such as the micro-controllers 16, 18, and 19 of FIG. 1, also may be employed with the circuit of FIG. 2. The data communication line 12 and the control line 14 shown in FIG. 1 as single lines also are illustrated in FIG. 2 as comprising line pairs.

In FIG. 2, the solid state switch 20 of FIG. 1 is illustrated as a pair of solid state switches 20A and 20B, and a second pair of switches 40A and 40B also. The first pair of solid state switches 20A and 20B are provided with control signals from the left-most one of the eight output pins of the micro-controller 17 over a line 21. This line is connected in parallel to a control input of each of the switches 20A and 20B. Similarly, a pair of solid state switches 20A and 20B. Similarly, a pair of solid state switches 40A and 40B have a control input or control toggle connected over a line 41 to the right-most one of the eight output pins of the micro-controller 17. The selection process for determining which of the serial devices controlled by the micro-controller 17 is to be interconnected for operation with the serial port of the computer 10 is the same in FIG. 2 as described previously in conjunction with FIG. 1.

It should be noted that, in the system shown in FIG. 2, all of the "A" solid state switches (such as the switches 20A and 40A) have their inputs connected in parallel to the data lines 12. Similarly, the inputs of the "B" solid state switches (such as the switches 20B and 40B) have their inputs connected in parallel to the control lines 14 of the serial port of the computer 10. Pairs of data lines 12 and control lines 14 are shown in FIG. 2 to adapt the system for use with either DCE or DTE computers. Only one of the two possible control lines 14 is actively used by the micro-controllers in any particular application, and the control line used depends on the computer configuration (DCE or DTE). As mentioned above in conjunction with FIG. 1, only one pair of such solid state switches (such as switches 20A and 20B) are enabled for any operation at any given time. All of the rest of the solid state switches for the entire system are in a non-conductive mode of operation; so that no signals pass through them. This is accomplished by a second "enabling" output (not shown) from the selected micro-controller operated in parallel with the output on the selected pin described in the following paragraph.

When the selected micro-controller, such as the micro-controller 17 of FIG. 2, is activated by recognition of its address through the addressing signal superimposed on the control leads 14, the micro-controller 17 then supplies one or the other of two signals, corresponding to Phase 4 of the above identified phases of the addressing signal, to switch the selected pair of switches 20A and 20B (or any other pairs of switches selected) in parallel to provide signals either to the serial device 22 or the serial device 23 for communication with the computer 10. The solid state switch 20A passes the data signals through the switch over leads 26 to the serial device 22 or over leads 27 to the serial device 23, in accordance with the state of operation of the switch. At the same time, the other half of the solid state switch pair, namely switch 20B, supplies the control signals through the switch to the serial device 22 over the leads 20 or to the serial device 23 over the leads 31.

If the signal from the micro-controller 17 is such to switch the state of the switches 20A and 20B for selection of the serial device 22, signals are passed through each of the switches 20A and 20B over the respective leads 26 and 32 to the serial device 22 in a manner such that, as far as the serial output port of the computer 10 is concerned, there is a direct connection between the selected serial device 22 and the data lines 12 and the control lines 14, as if the switches 20A and 20B were not in the circuit. It is readily apparent that no control signals and no data signals pass through the micro-controller 17 which is responsive only to the superimposed address selection signals on the control lines 14.

Further examination of FIG. 2 illustrates a similar connection of the solid state switches 40A and 40B, which are controlled over the lead 41 connected to the right-hand output pin of the micro-controller 17. Switches 40A and 40B are operated as a pair to supply data signals and control signals, respectively, to one or the other of a pair of serial output devices 42 and 43. The data signals are supplied over leads 50 and 51 from the solid state switch 40A; and the control signals are supplied over leads 46 and 47 to the serial devices 42 and 43, respectively, from the solid state switch 40B.

Similar pairs of solid state switches, connected to pairs of serial devices, are connected to all of the other six output pins of the micro-controller 17 and to all of the eight output pins of the other micro-controllers 16, 18, and 19. The selection process is as described above in conjunction with FIG. 1. FIG. 2, however, illustrates in greater detail the switch paths which are employed in the system operation.

Various changes and modifications will occur to those skilled in the art without departing from the true scope of the invention. The foregoing description should be considered illustrative of the invention only and not as limiting. For example, the system may be used on parallel ports, as well as the serial ports specifically described.

We claim:

1. A multiple device addressing and routing system for selectively supplying data from a single output port of a computer to one of a plurality of utilization devices, wherein such output port has at least a data line and a control line on which encoded selection signals are applied, said system including in combination:

controller means coupled to the control line of said output port, said controller means having at least one output line and having decoding means therein responsive to encoded selection signals appearing on such control line for producing one of two output signals on said output line thereof as determined by such encoded selection signals;

switch means having first and second states of operation, having a control input coupled to said output line and having first and second outputs, said switch means coupled to the data line of said output port for supplying signals appearing on the data line of said output port to a selected one of said first and second outputs of said switch means corresponding to said first and second states of operation thereof respectively in response to the output signal on said output line; and means for coupling first and second utilization devices to said first and second outputs of said switch means.

2. The combination according to claim 1 wherein said first output of said switch means comprises a first data line output and a first control line output, and said second output of said switch means comprises a data line output and a control line output; such that with said switch means in said first state of operation, said data line and said control line of said output port are coupled by said coupling means to a first utilization device and with said switch means in said second state of operation, said data line and said control line of said output port are coupled with a second utilization device by said coupling means.

3. The combination according to claim 2 wherein said switch means comprises a solid state switch.

4. The combination according to claim 3 wherein said controller means comprises an electronic micro-controller.

5. The combination according to claim 4 wherein said output port comprises an RS-232 computer serial output port.

6. The combination according to claim 4 wherein said output port is a 449 computer serial output port.

7. The combination according to claim 4 wherein said controller means has a plurality of output lines and wherein said switch means comprises a plurality of switch means, each different one of said plurality of switch means having the control input thereof coupled to a different output line of said controller means; and said means for coupling first and second utilization devices to the first and second outputs of said switch means comprises a plurality of coupling means each for coupling different pairs of first and second utilization devices to the first and second outputs of each of said different one of said plurality of switch means.

8. The combination according to claim 1 wherein said controller means comprises an electronic micro-controller.

9. The combination according to claim 8 wherein said switch means comprises a solid state switch.

10. The combination according to claim 1 wherein said output port comprises an RS-232 computer serial output port.

11. The combination according to claim 1 wherein said output port is a 449 computer serial output port.

12. The combination according to claim 1 wherein said switch means comprises a solid state switch.

13. A multiple device addressing and routing system for selectively supplying data from a single output port of a computer to one of a plurality of utilization devices wherein such output port has at least a data line, and a control line on which encoded selection signals are applied, said system including in combination:

a plurality of control means coupled in parallel to the control line of said output port, each of said control means having at least one output line and having decoding means therein for activating a selected one of said control means in response to uniquely encoded selection signals identifying each specific control means in response to encoded selection signals appearing on such control line, for producing one of two output signals on the output line thereof as determined at least in part by such encoded selection signals;

first and second switch means having for each of said control means with each of said switch means having a control input connected with the output of a corresponding control means, each of said switch means having first and second outputs, said first switch means coupled to the data line of said serial output port for supplying signals appearing on said data line to a selected one of said first and second outputs of said switch means corresponding to the operation thereof, and said second switch means coupled to the control line of said serial output port for supplying control signals appearing on said control line to a selected one of said first and second outputs of said second switch means corresponding to the operation thereof, the operation of said first and second switch means being established by the signals on the control input thereof;

means for coupling the data inputs of first and second utilization devices to the first and second outputs, respectively, of said first switch means; and means for coupling the control inputs of first and second utilization devices to the first and second outputs respectively of said second switch means.

14. The combination according to claim 13 wherein each of said control means has a plurality of outputs, only one of which is activated for the selected one of said control means for producing output signals thereon; each of the output lines of each of said control means is connected to the control inputs of first and second switch means uniquely associated therewith; and all of said first switch means are connected in parallel to the data line of said serial output port and all of said second switch means are connected in parallel to the control line of said serial output port for supplying, respectively, data signals and control signals therethrough in accordance with the state of operation of said first and second switch means.

15. The combination according to claim 14 wherein said first and second switch means are solid state switches.

16. The combination according to claim 15 wherein said control means is a micro-controller.

17. The combination according to claim 16 hwerein encoded selection signals applied on said control line are supplied at a baud rate which is high compared to the baud rate of control signals appearing on said control line.

18. The combination according to claim 16 wherein said serial output port is an RS-232 serial port.

19. The combination according to claim 16 wherein said serial output port is a 449 serial port.

20. The combination according to claim 16 wherein the encoded selection signals comprise a first portion for addressing and selecting a unique one of said control means, a second portion for processing by the selected one of said control means for selecting an output line thereof, and a third portion for applying a signal on the selected output line for operating said first and second solid state switches to select a unique one of said outputs thereof for coupling one of said first and second utilization devices for receiving data signals on said data line and contol signals on said control line from said serial output port.

21. The combination according to claim 13 wherein said first and second switch means are solid state switches.

22. The combination according to claim 21 wherein the encoded selection signals comprise a first portion for addressing and selecting a unique one of said control means, a second portion for processing by the selected one of said control means for selecting an output line thereof, and a third portion for applying a signal on the selected output line for operating said first and second solid state switches to select a unique one of said outputs thereof for coupling one of said first and second utilization devices for receiving data signals on said data line and control signals on said control line from said serial output port.

23. The combination according to claim 13 hwerein encoded selection signals applied on said control line are supplied at a baud rate which is high compared to the baud rate of control signals appearing on said control line.

24. The combination according to claim 13 wherein said controller means is a micro-controller.

25. The combination according to claim 13 wherein said serial output port is an RS-232 serial port.

26. The combination according to claim 13 wherein said serial output port is a 449 serial port.

27. The combination according to claim 13 wherein the encoded selection signals comprise a first portion for addressing and selecting a unique one of said control means, a second portion for processing by the selected one of said control means for selecting an output line thereof, and a third portion for applying a signal on the selected output line for operating said first and second solid state switches to select a unique one of said outputs thereof for coupling one of said first and second utilization devices for receiving data signals on said data line and control signals on said control line from said serial output port.

28. The combination according to claim 27 wherein encoded selection signals applied on said control line are supplied to a baud rate which is high compared to the baud rate of control signals appearing on said control line.

29. The combination according to claim 28 wherein each of said control means has a plurality of outputs, only one of which is activated for the selected one of said control means for producing output signals thereon; each of the output lines of each of said control means is connected to the control inputs of first and second switch means uniquely associated therewith; and all of said first switch means are connected in parallel to the data line of said serial output port and all of said second switch means are connected in parallel to the control line of said serial output port for supplying, respectively, data signals and control signals therethrough in accordance with the state of operation of said first and second switch means.

* * * * *